United States Patent [19]
von Tell

[11] 4,371,568
[45] Feb. 1, 1983

[54] METHOD AND MEANS TO FILL OUT UNEVEN SURFACES, FOR EXAMPLE IN BLOCK BOARDS

[76] Inventor: Björn R. L. von Tell, Bergstigen 14, S-138 00 Älta, Sweden

[21] Appl. No.: 263,771

[22] Filed: May 14, 1981

[30] Foreign Application Priority Data

May 23, 1980 [SE] Sweden ................................ 8003880

[51] Int. Cl.³ ........................ B32B 35/00; B05D 3/02; B05D 3/12; B05D 1/02

[52] U.S. Cl. ...................................... 427/140; 118/57; 118/101; 118/312; 118/642; 427/195; 427/345; 427/346; 427/358; 427/424; 427/393

[58] Field of Search ................. 427/13, 140, 195, 350, 427/351, 355, 368, 393, 346, 358, 345, 424; 118/57, 101, 312, 642

[56] References Cited

U.S. PATENT DOCUMENTS

| | | | |
|---|---|---|---|
| Re. 30,691 | 7/1981 | Hallstron et al. | 427/140 |
| 3,457,094 | 7/1969 | Elmendorf et al. | 427/140 |

FOREIGN PATENT DOCUMENTS

| | | |
|---|---|---|
| 373525 | 2/1975 | Sweden . |
| 1119170 | 11/1966 | United Kingdom . |
| 1165811 | 5/1968 | United Kingdom . |
| 1365002 | 3/1972 | United Kingdom . |

*Primary Examiner*—Michael R. Lusignan
*Attorney, Agent, or Firm*—Kurt Kelman

[57] ABSTRACT

The present invention relates to a method to fill out uneven surfaces, whereby a fine grain, fusible powder is excessively applied to the surface to be treated, the excess is removed, and the remaining powder which fills cracks and cavities is temporarily heated to melt. The invention further reveals a means to carry out the method.

11 Claims, 5 Drawing Figures

METHOD AND MEANS TO FILL OUT UNEVEN SURFACES, FOR EXAMPLE IN BLOCK BOARDS

When manufacturing wooden products, particularly glued such products, unevennesses in the surface often occur, due to joints, knots, knot holes and the like. A common way to eliminate such unevennesses is to apply some sort of putty. Putty normally consists of sem-solid paste, i.e. a dispersion of one or more materials containing solids. Putty used on wooden products is often blended with wood flour and perhaps colouring pigment in order to make the improvement as good as possible. The putty is usually applied with a knife, i.e. a spade-like object made of steel, wood, rubber or the like, or it can be applied with a roller or a spray-pistol, and this procedure may be finished off by manual application.

When manufacturing so called block board strips, for example floor parquet boards, 85 percent of the production can be estimated to run flawlessly without need for improvement of the surfaces in question. Out of the remaining 15 percent of the production, around 70 percent can be allowed to continue after uncomplicated manual improvements like filling joints with putty. The remaining 30 percent require more thorough treatment, and in these cases wood cement is often used to fill out knot holes and other deficiencies. This procedure requires a lot of manual work. Some waste will inevitably come out of these last mentioned 30 percent of the production.

When putty is applied, for example with a roller, it is next to impossible to re-use the excess. Most often it will be necessary to treat the surfaces in question by sanding them. Considerable amounts of putty will fall into the gaps between the boards of the conveyor.

The present invention eliminates the above mentioned disadvantages, and a speedy method is obtained, whereby all excess material can be taken care of and re-used.

The invention is based on a completely new principal. Thus, instead of applying putty on the surface to be treated, a powder is applied excessively, whereupon the excess, or a considerable part of it, is removed by scraping, sucking or brushing, so that the unevennesses stay filled by the powder. While the powder is applied, the surface can be subjected to vibration to allow the powder to better penetrate into cracks and cavities. The vibration frequency should be adjusted so as to pack the powder into the cracks but keep it from being thrown out again. Then the powder is heated temporarily until it melts, whereupon it will be allowed to harden.

Suitable powders for this invention could be pulverulent plastic materials which have been inked. The currently most common among these are epoxy, vinyl, and amido plastics. It can generally be said that most plastics can be used, and apart from the already mentioned ones, there are for example polyethene (LD as well as HD polyethene), cellulose acetate butyrate, chlorinated polyethene, polytetrafluorethene, fluorine polyethene, polymethylmethacrylate, polycarbonate, polyurethane, polystyrene, thermoplastic polyesters, thermosetting polyesters and acrylic plastics.

In order to make the method according to the present invention more convenient, a powder requiring a short period of heating should be used, as this will allow for a shorter heating zone.

Should the powder amount shrink, or prove not being sufficient, during the temporary heating, it can become necessary to repeat the treatment, that is, lead the surface through the device two or more times, or to arrange the application of powder, the scraping and the heating in series along the feeder conveyor on which the surface to be treated is placed.

The powder should spread easily in order to form an even layer. A curtain applier should be vibrating at a relatively high frequency in order to make the powder spread evenly across the surface. The vibration of the surface, on the other hand, should be at a relatively low frequency to allow the powder to pack into the surface cavities and not be thrown out again.

The dispersion temperature of the powder is to be well above its melting temperature. To ascertain proper adhesion to the surface, a powder suitable for this purpose should be chosen, or pre-treatment of the surface should be carried out. Thermosetting plastic powder should have a short setting time to avoid damage to the surface to be treated.

An apparatus suitable to carry out the method in accordance with the invention is shown on the attached drawing.

Figure 1:
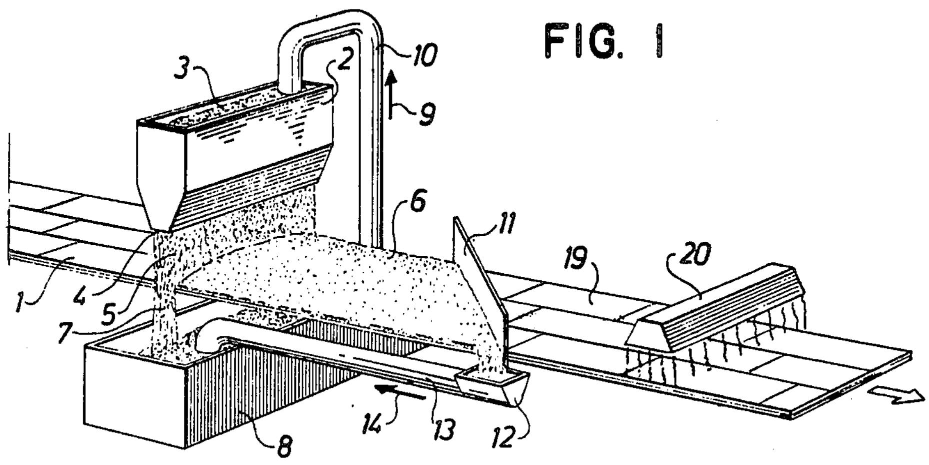
FIG. 1 shows in perspective view, a means according to the invention.

A board, in this case a laminated parquet board 1, is transported along a feeder conveyor (not shown). Across and above the conveyor a trough-like container 2 containing powder 3, is located. The bottom 4 of the container has an outlet, giving off a curtain flow 5 of powder. The powder forms a layer 6 on the laminated parquet board 1, whereby excess material 7 is collected in a tank 8 underneath the conveyor. A feeding device (not shown) transports the powder in the direction of the arrow 9 from the tank 8, through a pipe 10, back to the container 2. Some distance from the powder curtain a scraper device 11 is arranged, parallel to the top side of the laminated parquet board, which scraper pushes the layer material 6 into a collecting funnel 12. The funnel 12 takes the excess powder material via a duct 13 in the direction of the arrow 14 back to the tank 8. As can be clearly seen from the detailed drawing FIG. 2, the scraper 11 must be shaped so as to carefully fit the outer profile of the board 1, that is, should the board be equipped with a tongue 15, the corresponding portion 16 of the scraper must conform to the tongue 15 so that the shelf 17 (which is formed by the top side of the tongue) is cleared of excess layer material 18.

Figure 2:
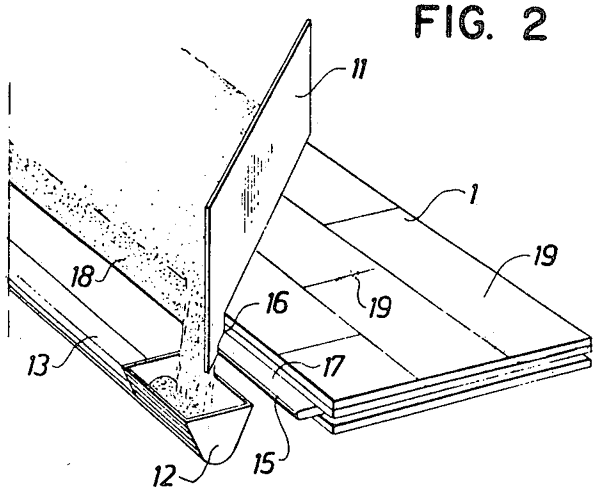
FIG. 2 shows a detail of the means according to FIG. 1.

The scraper device 11, which in fact could be a scraper blade, scrapes the top of the transported laminated parquet board 1, leaving powdered areas 19, FIGS. 1 and 2, in the cracks and cavities in the board. In practice it could be advantageous to vibrate the container 2 in order to achieve a homogeneous powder flow 5 to obtain an even spread of powder on the board. The frequency of this vibration can be relatively high. Also the board should be subjected to vibration during the treatment in order to avoid lumps in the powder.

The drawings do not show any vibrator device, but the board could preferably be made to vibrate at a relatively low frequency to avoid that the remaining powder 19 (after the scraper) is thrown out of the cavities. As is shown in FIG. 1, a heat radiating device 20 is arranged above the top of the laminated parquet board, which device temporarily heats the surface of the board 1, whereby any plastic powder is brought to melting, and to homogeneously fill out cracks and cavities 19. Should the cracks be of a considerable size, it could happen, with some kinds of plastic powder, that it does not completely fill the cracks in question. In such cases, the board can be recycled for a repeated treatment so that the cracks become completely filled. Under some circumstances it can in practice be desirable to use a powder, which, when heated and melted, maintains or even increases its volume. Such powders often contain so called skeleton builders which expand when heated up.

Figure 3:
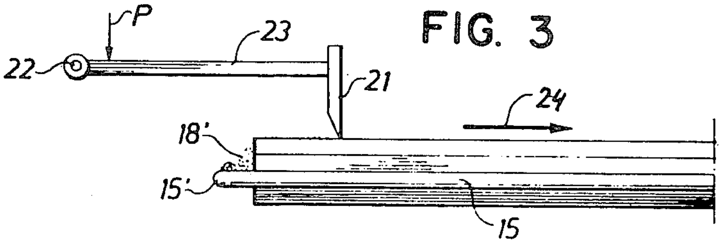
FIG. 3 shows in lateral view an additional scraper device, which can be connected to the means according to FIG. 1.

Should more than one board 1 be transported abreast with each other in the production line, it cannot be avoided that powder falls down into the gaps between the boards. To remove this powder, suction devices or a further scraper can be supplied. A laminated parquet board is usually equipped with a tongue 15' (FIG. 3) at one of its ends. Here also a powder ridge 18' will form. In such cases, it is necessary to arrange one further scraper 21, hinged on a spindle 22 from an arm 23. As the board moves in the direction of the arrow 24, the scraper 21 will fall down at the end of the board to contact with the tongue 15', and during the continuous forward movement of the board, push off the powder ridge 18'. Instead of the scraper 21, some sort of suction device or brush can naturally be arranged, and activated when the board end reaches a certain position on the conveyor.

Figure 4:
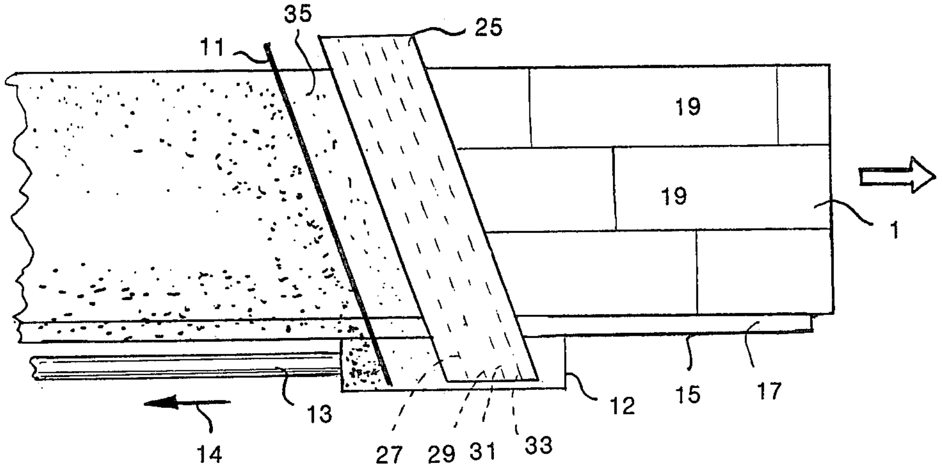
FIG. 4 shows one further form of execution seen from above.
Figure 5:
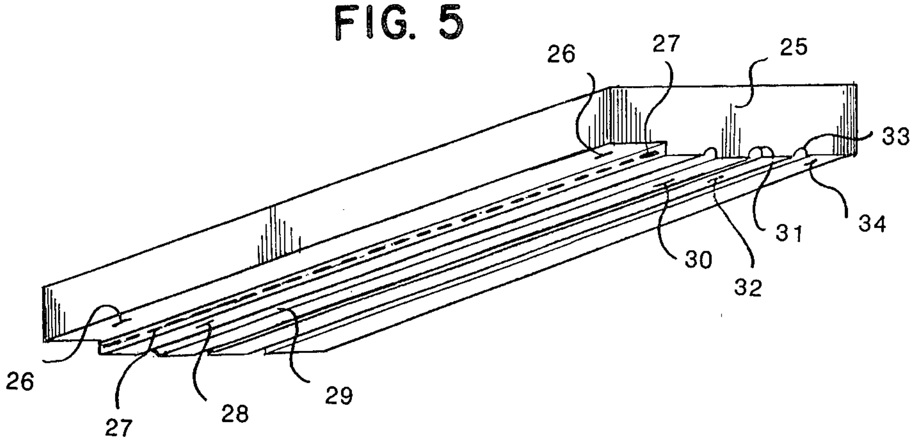
FIG. 5 shows, scaled up, and in perspective view, a heater device by the means according to FIG. 4.

It can in some cases be advantageous to use the method according to FIGS. 4 and 5, particularly when repeated treatment of a laminated parquet board is undesirable. As can be seen from FIG. 4, a heating device 25, to heat mainly by direct contact, is arranged right after the scraper blade 11. The device 25, like the scraper blade 11, is arranged ascew in relation to the board's 1 moving direction in order to serve as one further scraper. To this end, the tank 12 is made to reach underneath the area surrounding the device 25 as can be seen in FIG. 4, to collect any material scraped down by the device 25.

FIG. 5 reveals the bottom side of the device 25. It is understood that the device comprises for example electric heating cells (not shown). The side facing the board 1 is executed in such a way that a first surface 26 is parallel to, but distant from, the board surface to be treated. The surface 26 is adjacent to an edge surface 27 at a right angle, which surface is in turn adjacent to a surface 28 parallel to the surface 26, also at some distance from the board surface. The last mentioned surface 28 is adjacent to a groove 29, which in turn becomes surface 30, arranged to be in close contact with the board surface. The surface 30 is adjacent to a groove 31, turning into one surface 32 and one more groove 33, and then one last surface 34. The surfaces 30, 32, and 34 are all to be in close contact with the surface of the board 1.

When using the device, the below procedure is to be followed. The scraper blade is adjusted in relation to the board surface so that it leaves a thin layer 35 of powder on the board surface, after that the cracks and cavities in question have been filled with powder. When the powder layer 35, preferably containing skeleton builders, reaches underneath the surface 26, it will be heated by heat radiation and expand. During the continuous moving of the board 1, the powder will come into contact with the edge surface 27 and scraped aside towards the tank 12. During this movement, further filling out of unevennesses takes place. Due to the fact that also the surface 28 is located at a distance, though very small, in relation to the board surface, heating by radiation will take place here, more intense than before, so that melting of the powder material will start. Because of the edge formed between groove 29 and surface 30, further scraping off of material will take place. The surface 30 is the first surface to be in direct thermal contact with the board surface, and final heating occurs then in connection with the contact with the subsequent surfaces 32 and 34. The grooves 31 and 33 form channels through which any residual powder material can run, i.e. powder in excess of the powder in the cavities. When the board has left the last surface 34, the powder will be completely melted and evened out, whereupon it will be allowed to set.

By this procedure and because of the special design of the working surfaces of the device 25, a very homogeneous result is obtained, and normally no further treatment with regard to unevennesses will be required.

The invention is naturally not limited to the method and means shown in the attached drawings. Other types of curtain application can be utilized, as well as the arrangement of several curtain appliers and scraper devices in series, in order to ascertain the complete filling out of cracks and cavities. Furthermore, other heating devices can be employed without deviating from the principle of the present invention.

In some instances it can be necessary to pre-treat the board surface before the application of powder to improve the adhesion of said powder. This might be the case for some oily woods. This pre-treatment could be in the form of spraying on a suitable liquid or glue.

The essential advantage of the present invention is that any flaws in the wear surfaces of the laminated parquet board do not have to be sought for, and do not require any post-inspection, since all boards are being fed through a powder curtain applier as is shown in FIG. 1, irrespective of the surfaces being flawless or not. The method thus means considerable saving and simplified handling.

What I claim is:

1. A method of filling cavities in an uneven surface of a wooden article to smooth said surface, which comprises the steps of (a) applying a curtain of a fusible powder to said surface from an applicator in an amount in excess of the amount required to fill the cavities while vibrating the applicator at a relatively high frequency and subjecting the wooden article to vibration at a relatively low frequency, (b) scraping the excess amount of the fusible powder from the surface to remove said excess amount of powder therefrom, (c) supplying heat to the fusible powder remaining in the cavities until the powder has melted therein to form a molten filling thereof, and (d) discontinuing the supply of heat and permitting the molten filling to harden in the cavities whereby the cavities are permanently filled.

2. The filling method of claim 1, wherein the excess amount of the fusible powder is scraped from the surface in a succession of steps including a first step of scraping a major part of the excess amount of powder off the surface to leave a thin layer of powder thereon and successive steps of exposing the thin powder layer to successively increasing heat while scraping the surface until the thin layer has been entirely removed.

3. The filling method of claim 1 or 2, wherein the fusible powder includes an agent expanding the power in volume when subjected to heat.

4. The filling method of claim 1, wherein the article is subjected to said vibration of a relatively low frequency while the excess amount of powder is scraped off the surface.

5. The filling method of claim 1, wherein the succession of steps of applying the curtain of fusible powder, scraping, supplying of heat and hardening of the molten material in the cavities is repeated in a plurality of operating cycles until all the cavities have been completely filled.

6. An apparatus for filling cavities in an uneven surface of a wooden article to smooth said surface, which comprises (a) a feeding path for moving the article along said path,
(b) an applicator arranged in said path for applying a curtain of a fusible powder to said surface in an amount in excess of the amount required to fill the cavities,
(c) means for vibrating the applicator at a relatively high frequency,
(d) means for vibrating the wooden article at a relatively low frequency,
(e) scraping means for scraping the excess amount of the fusible powder off the surface to remove the excess powder amount therefrom,
(f) means for collecting the scraped excess amount of the fusible powder and for returning the collected amount of the fusible powder to the applicator, and
(g) means for supplying heat to the fusible powder remaining in the cavities until the powder is melted.

7. The apparatus of claim 6, wherein the scraping means has a shape conforming closely to the surface and any portions of the wooden article adjacent to the surface whereby the removal of all the excess powder to the collecting means is assured.

8. The apparatus of claim 6, wherein the scraping means is arranged to remove successively thinner layers of the excess amount of the fusible powder from the surface and comprises the heat supplying means arranged to supply successively more heat to the powder as the layers thereof are removed.

9. The apparatus of claim 8, wherein the heat supplying means comprises heat conducting scraping surfaces successively closer to the surface of the wooden article.

10. The apparatus of claim 9, wherein the scraping means has longitudinal grooves extending transversely to the path between at least some of the heat conducting scraping surfaces.

11. The apparatus of claim 9 or 10, wherein said heat conducting surfaces extend substantially parallel to the surface of the wooden article and are arranged in successive steps closer to the surface of the wooden article, a last one of the heat conducting surfaces being in contact with the surface of the wooden article.

* * * * *